United States Patent
Xiao et al.

(10) Patent No.: US 10,764,936 B2
(45) Date of Patent: Sep. 1, 2020

(54) DATA TRANSMISSION METHOD BASED ON NON-ACCESS STRATUM MESSAGES, BASE STATION, AND USER EQUIPMENT

(71) Applicant: SHARP KABUSHIKI KAISHA, Sakai, Osaka (JP)

(72) Inventors: Fangying Xiao, Shanghai (CN); Renmao Liu, Shanghai (CN); Ningjuan Chang, Shanghai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 109 days.

(21) Appl. No.: 16/067,060

(22) PCT Filed: Dec. 30, 2016

(86) PCT No.: PCT/CN2016/113689
§ 371 (c)(1),
(2) Date: Jun. 28, 2018

(87) PCT Pub. No.: WO2017/114498
PCT Pub. Date: Jul. 6, 2017

(65) Prior Publication Data
US 2019/0007983 A1    Jan. 3, 2019

(30) Foreign Application Priority Data

Dec. 30, 2015  (CN) .......................... 2015 1 1025054

(51) Int. Cl.
| | |
|---|---|
| *H04W 76/10* | (2018.01) |
| *H04W 4/00* | (2018.01) |
| *H04W 24/02* | (2009.01) |
| *H04W 8/02* | (2009.01) |
| *H04W 76/27* | (2018.01) |
| *H04W 4/70* | (2018.01) |
| *H04W 76/11* | (2018.01) |

(52) U.S. Cl.
CPC ............ *H04W 76/10* (2018.02); *H04W 4/00* (2013.01); *H04W 4/70* (2018.02); *H04W 8/02* (2013.01);
(Continued)

(58) Field of Classification Search
CPC ....... H04W 76/10; H04W 4/70; H04W 76/27; H04W 4/00; H04W 8/02; H04W 24/02; H04W 76/11
See application file for complete search history.

(56) References Cited

U.S. PATENT DOCUMENTS

2008/0311892 A1* 12/2008 Lee ..................... H04W 72/005
                                                              455/414.1
2016/0316494 A1   10/2016 Quan et al.
(Continued)

FOREIGN PATENT DOCUMENTS

| CN | 102638900 A | 8/2012 |
|---|---|---|
| CN | 104144467 A | 11/2014 |

(Continued)

OTHER PUBLICATIONS

3GPP TS36.331 V10.17.0 (Jun. 2015) 3rd Generation Partnership Project; Technical Specification Group Radio Access Network; Evolved Universal Terrestrial Radio Access (E-UTRA); Radio Resource Control (RRC); Protocol specification (Release 10).

(Continued)

*Primary Examiner* — Walter J Divito
*Assistant Examiner* — Anthony Luo
(74) *Attorney, Agent, or Firm* — ScienBiziP, P.C.

(57) ABSTRACT

A method for transmitting non-access stratum (NAS) messages is provided, the method comprising: receiving, from a user equipment, a request message for establishing a radio resource control (RRC) connection; and sending to the user equipment a response message RRC connection setup on a first signaling radio bearer (SRB). The response message RRC connection setup comprises configuration information for a second SRB, the second SRB is used for transmitting a first NAS message, and the configuration information is used to configure the second SRB to support a radio link control unacknowledged mode (RLC UM). The present invention further provides a corresponding base station and user equipment.

16 Claims, 3 Drawing Sheets

(52) U.S. Cl.
CPC .......... *H04W 24/02* (2013.01); *H04W 76/27* (2018.02); *H04W 76/11* (2018.02)

(56) References Cited

U.S. PATENT DOCUMENTS

2018/0192335 A1* 7/2018 Bontu ............. H04W 36/00835
2018/0213579 A1* 7/2018 Hong ................... H04W 76/12

FOREIGN PATENT DOCUMENTS

| EP | 3079384 A | 10/2016 |
|---|---|---|
| WO | 2014/181178 A1 | 11/2014 |
| WO | 2015/100548 A1 | 7/2015 |

OTHER PUBLICATIONS

Qualcomm Incorporated, New Work Item: NarrowBand IOT (NB-IOT), RP-151621, 3GPP TSG RAN Meeting #69, Phoenix, USA, Sep. 14-16, 2015.

Ericsson, NSN, New Work Item on Even Lower Complexity and Enhanced Coverage LTE UE for MTC, RP-140990, 3GPP TSG RAN Meeting #64, Sophia Antipolis, France, Jun. 10-13, 2014.

3rd Generation Partnership Project;Technical Specification Group Radio Access Network; Evolved Universal Terrestrial Radio Access (E-UTRA); Radio Resource Control (RRC); Protocol specification (Release 12), 3GPP TS36.331 V12.7.0 (Sep. 30, 2015).

* cited by examiner

DATA TRANSMISSION METHOD BASED ON NON-ACCESS STRATUM MESSAGES, BASE STATION, AND USER EQUIPMENT

TECHNICAL FIELD

The present invention relates to the field of wireless communication technology. More specifically, the present invention relates to a method for data transmission using non-access stratum messages, and a corresponding base station and user equipment.

BACKGROUND

With the rapid growth of mobile communications and great progress of technology, the world will move towards a fully interconnected network society where anyone or any device can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, the subject of how to design a system that better supports the Internet of Everything needs to be studied further.

In the standard of Long Term Evolution (LTE) of the Third Generation Partnership Project (3GPP), machine-to-machine communication is called machine type communication (MTC). MTC is a data communication service that does not require human participation. Deployment of large-scale MTC user equipments can be used in such fields as security, tracking, billing, measurement, and consumer electronics, and specifically relates to applications, including video monitoring, supply chain tracking, intelligent meter reading, and remote monitoring. MTC requires lower power consumption and supports lower data transmission rate and lower mobility. The current LTE system is mainly for man-to-man communication services. The key to achieving competitive advantages of scale and application prospects of MTC services is that the LIE network supports low-cost MTC devices.

In addition, some MTC user equipments need to be installed in the basement of a residential building or at a position within the protection of an insulating foil, a metal window, or a thick wall of a traditional building; MTC suffers from more serious and obvious penetration losses from air interfaces, compared to that of conventional equipment terminals (such as mobile phones and tablet computers) in LTE networks. 3GPP decides to study the project design and performance evaluation of MTC equipments with an additional 20 dB coverage enhancement. It should be noted that MTC equipments located in an area with poor network coverage have the Wowing characteristics: extremely low data transmission rates, low latency requirements, and limited mobility. In view of the above characteristics of MTC, the LTE network can further optimize some signals and/or channels to better support MTC services.

Therefore, at the 3GPP RAN #64 plenary session held in June 2014, a new MTC work item with low complexity and enhanced coverage for Rel-13 was proposed (see non-patent literature: RP-140990 New work Item on Even Lower Complexity and Enhanced Coverage LTE UE for MTC, Ericsson, NSN). In the description of this work item, an LTE Rel-13 system needs to support uplink/downlink 1.4 MHz RF bandwidth for an MTC user equipment to operate at any system bandwidth (for example, 1.4 MHz, 3 MHz, 5 MHz, 10 MHz, 15 MHz, or 20 MHz). The standardization of the work item will be completed at the end of 2015.

In addition, for better implementation of the Internet of Everything, at the 3GPP RAN #69 plenary session held in September 2015, a new work item was further proposed (see non-patent literature: RP-151621 New Work Item: Narrow-Band IOT (NB-IOT), which may be called narrowband Internet of Things (NB-IOT). In the description of this item, NB-IOT needs to support uplink/downlink 180 KHz RF bandwidth and three modes of operation: stand-alone mode of operation, guard-band mode of operation, and in-band mode of operation. The stand-alone mode of operation is to implement NB-IOT on the existing GSM band. The guard-band mode of operation is to implement NB-IOT on the guard band of one LIE carrier. The in-band mode of operation is to implement NB-IOT on the existing LTE band. Different bearer modes may adopt different physical parameters and processing mechanisms.

In the existing LTE system, an LTE user equipment (UE) implements data transmission through a service request process. In the service request process, a base station (eNB) first acquires UE context information from a core network (CN) and saves it locally, and then sends a radio resource control (RRC) connection reconfiguration message to the UE to establish a data radio bearer (DRB), and data is transmitted through the data radio bearer. In an NB-IoT system, a UE in an RRC IDLE state needs to transmit only a small amount of data (small data) in one RRC connection. If small data is transmitted using the existing LIE data transmission process, the utilization rate of radio resources will be lowered. In order to reduce signaling overheads, the SA2 working group arrives at the following two solutions applicable to small data transmission: (1) a control plane data transmission manner (CP solution for short) based on non-access stratum (NAS) messages: in this solution, data is encapsulated in an NAS message packet data unit (NAS PDU) and transmitted to a receiving end through a signaling radio bearer (SRB). (2) A user plane data transmission manner (UP solution for short) based on access stratum context information stored in an eNB: in this solution, access stratum context information is established in an eNB and a data bearer is established, and data is transmitted and sent to a receiving end through the data radio bearer. Meanwhile, SA2 also concludes that the CP solution is a solution that must be implemented in a product, while the UP solution is an optional implementation solution.

For narrowband systems such as NB-IOT, eMTC, and MMTC, different service types usually require data transmission with different reliabilities. In the CP solution, data is encapsulated in an NAS message and transmitted on an SRB. In the existing LTE system, the SRB provides reliable data transmission based on a radio link control acknowledged mode (RLC AM). For service types requiring low reliability the CP solution based on the RLC AM causes large signaling overheads and low resource utilization rate. Therefore, the CP solution needs to provide data transmission services with different reliabilities for different service types.

SUMMARY OF INVENTION

According to one aspect of the present invention, a method for transmitting non-access stratum (NAS) messages is provided, the method comprising: receiving, from a user equipment, a radio resource control (RRC) connection request message; and sending to the user equipment a response message RRC connection setup on a first signaling radio bearer (SRB). The response message RRC connection setup comprises configuration information for a second SRB, the second SRB is used for transmitting a first NAS message, and the configuration information is used to configure the second SRB to support a radio link control unacknowledged mode (RLC UM).

Preferably, the first NAS message comprises an NAS data message and an NAS signaling message.

Preferably, the response message RRC connection setup also comprises configuration information for a third SRB, the third SRB is used for transmitting a second NAS message, and the configuration information is used to configure the third SRB to support a radio link control unacknowledged mode (RLC UM) or a radio link control acknowledged mode (RLC AM).

Preferably, the first NAS message comprises an NAS data message, and the second NAS message comprises an NAS signaling message.

Preferably, the first SRB uses a common control channel (CCCH) logical channel, and the second SRB uses a dedicated control channel (DCCH) logical channel.

Preferably, the first NAS message comprises an indication for a content carried in the first NAS message.

According to another aspect of the present invention, a method for transmitting non-access stratum (NAS) messages is provided, the method comprising: sending a radio resource control (RRC) connection request message to a base station; and receiving a response message RRC connection setup from the base station on a first signaling radio bearer (SRB). The response message RRC connection setup comprises configuration information for a second SRB, the second SRB is used for transmitting a first NAS message, and the configuration information is used to configure the second SRB to support a radio link control unacknowledged mode (RLC UM).

Preferably, the first NAS message comprises an NAS data message and an NAS signaling message.

Preferably, the response message RRC connection setup further comprises configuration information for a third SRB; the third SRB is used for transmitting a second NAS message, and the configuration information configures the third SRB to support a radio link control unacknowledged mode (RLC UM) or a radio link control acknowledged mode (RLC AM). Preferably, the first NAS message comprises an NAS data message, and the second NAS message comprises an NAS signaling message.

Preferably, the first SRB uses a common control channel (CCCH) logical channel, and the second SRB uses a dedicated control channel (DCCH) logical channel.

Preferably, the first NAS message comprises an indication for a content carried in the first NAS message.

According to another aspect of the present invention, a base station is provided, comprising: a receiving unit, configured to receive a radio resource control (RRC) connection request message from a user equipment; a configuration unit, configured to generate response message an RRC connection setup, where the response message RRC connection setup comprises configuration information for a second SRB, the second SRB is used for transmitting a first non-access stratum (NAS) message, and the configuration information configures the second SRB to support a radio link control unacknowledged mode (RLC UM); and a sending unit, configured to send the response message RRC connection setup to the user equipment on a first signaling radio bearer (SRB).

Preferably, the first NAS message comprises an NAS data message and an NAS signaling message.

Preferably, the response message RRC connection setup further comprises configuration information for a third SRB; the third SRB is used for transmitting a second NAS message, and the configuration information configures the third SRB to support a radio link control unacknowledged mode (RLC UM) or a radio link control acknowledged mode (RLC AM). Preferably, the first NAS message comprises an NAS data message, and the second NAS message comprises an NAS signaling message.

Preferably, the first SRB uses a common control channel (CCCH) logical channel, and the second SRB uses a dedicated control channel (DCCH) logical channel.

Preferably, the first NAS message comprises an indication for a content carried in the first NAS message.

According to another aspect of the present invention, a user equipment is provided, comprising: a sending unit, configured to send a radio resource control (RRC) connection request message to a base station; and a receiving unit, configured to receive a response message RRC connection setup from the base station on a first signaling radio bearer (SRB). The response message RRC connection setup comprises configuration information for a second SRB; the second SRB is used for transmitting a first non-access stratum (NAS) message; and the configuration information configures the second SRB to support a radio link control unacknowledged mode (RLC UM).

Preferably, the first NAS message comprises an NAS data message and an NAS signaling message.

Preferably, the response message RRC connection setup further comprises configuration information for a third SRB; the third SRB is used for transmitting a second NAS message, and the configuration information configures the third SRB to support a radio link control unacknowledged mode (RLC UM) or a radio link control acknowledged mode (RLC AM). Preferably, the first NAS message comprises an NAS data message, and the second NAS message comprises an NAS signaling message.

Preferably, the first SRB uses a common control channel (CCCH) logical channel, and the second SRB uses a dedicated control channel (DCCH) logical channel.

Preferably, the first NAS message comprises an indication for a content carried in the first NAS message.

According to another aspect of the present invention, a user equipment (UE) is provided, comprising: a sending unit, configured to send a radio resource control (RRC) connection request message; and a receiving unit, configured to receive an RRC connection setup message through a first signaling radio bearer SRB0 that uses a common control channel (CCCH) logical channel, where the RRC connection setup message is used for establishing a second signaling radio bearer SRB1 that uses a first DCCH logical channel and a third signaling radio bearer SRB1bis that uses a second DCCH logical channel, the second signaling radio bearer SRB1 has a first logical channel identifier, and the third signaling radio bearer SRB1bis has a second logical channel identifier. The first logical channel identifier of SRB1 is different from the second logical channel identifier of SRB1bis.

Preferably, SRB1 is used for RRC messages and NAS messages.

Preferably, SRB1bis is used for RRC messages and NAS messages.

Preferably, the first logical channel identifier of SRB1 and the second logical channel identifier of SRB1bis are predefined.

According to another aspect of the present invention, a method executed by a user equipment (UE) is provided, which comprises: sending a radio resource control (RRC) connection request message; and receiving an RRC connection setup message through a first signaling radio bearer SRB0 that uses a common control channel (CCCH) logical channel, where the RRC connection setup message is used for establishing a second signaling radio bearer SRB1 that uses a first DCCH logical channel and a third signaling radio bearer SRB1bis that uses a second DCCH logical channel, the second signaling radio bearer SRB1 has a first logical channel identifier, and the third signaling radio bearer SRB1bis has a second logical channel identifier. The first logical channel identifier of SRB1 is different from the second logical channel identifier of SRB1bis.

Preferably, SRB1 is used for RRC messages and NAS messages.

Preferably, SRB1bis is used for RRC messages and NAS messages.

Preferably, the first logical channel identifier of SRB1 and the second logical channel identifier of SRB1bis are predefined.

According to another aspect of the present invention, a base station (eNB) is provided, which comprises: a receiving unit, configured to receive a radio resource control (RRC) connection request message from a user equipment (UE); and a sending unit, configured to send an RRC connection setup message to the UE through a first signaling radio bearer SRB0 that uses a common control channel (CCCH) logical channel, where the RRC connection setup message is used for establishing a second signaling radio bearer SRB1 that uses a first DCCH logical channel and a third signaling radio bearer SRB ibis that uses a second DCCH logical channel, the second signaling radio bearer SRB1 has a first logical channel identifier, and the third signaling radio bearer SRB1bis has a second logical channel identifier. The first logical channel identifier of SRB1 is different from the second logical channel identifier of SRB1bis.

Preferably, SRB1 is used for RRC messages and NAS messages.

Preferably, SRB1bis is used for RRC messages and NAS messages.

Preferably, the first logical channel identifier of SRB1 and the second logical channel identifier of SRB1bis are predefined.

According to another aspect of the present invention, a method executed by a base station (eNB) is provided, which comprises: receiving a radio resource control (RRC) connection request message from a user equipment (UE); and sending an RRC connection setup message to the UE through a first signaling radio bearer SRB0 that uses a common control channel (CCCH) logical channel, where the RRC connection setup message is used for establishing a second signaling radio bearer SRB1 that uses a first DCCH logical channel and a third signaling radio bearer SRB1bis that uses a second DCCH logical channel, the second signaling radio bearer SRB1 has a first logical channel identifier, and the third signaling radio bearer SRB1bis has a second logical channel identifier. The first logical channel identifier of SRB1 is different from the second logical channel identifier of SRB1bis.

Preferably, SRB1 is used for RRC messages and NAS messages.

Preferably, SRB1bis is used for RRC messages and NAS messages.

Preferably, the first logical channel identifier of SRB1 and the second logical channel identifier of SRB1bis are predefined.

BRIEF DESCRIPTION OF DRAWINGS

The above and other features of the present invention will become more apparent from the following detailed description in conjunction with the accompanying drawings.

DESCRIPTION OF EMBODIMENTS

Figure 1:
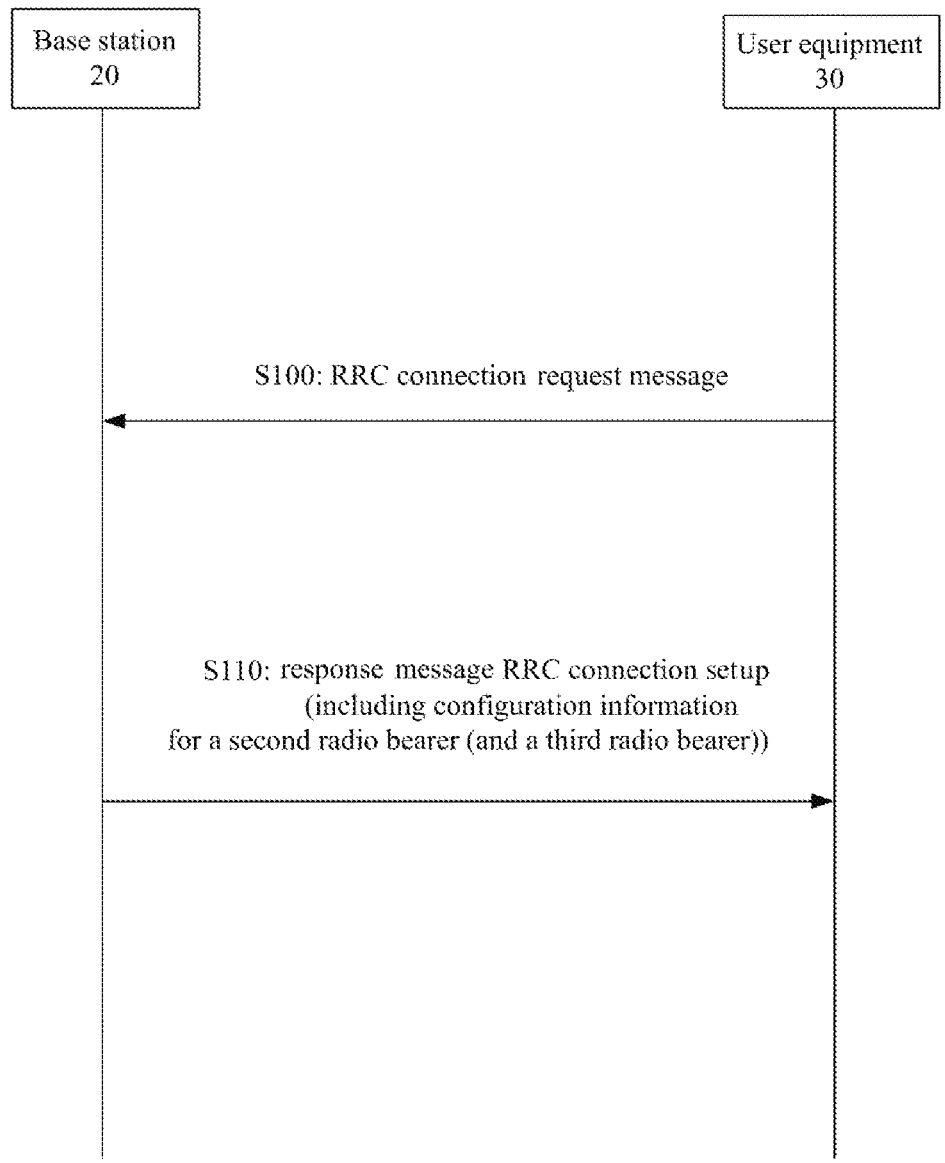
FIG. 1 is a schematic diagram illustrating configuration of signaling radio bearers between a base station and a user equipment according to an embodiment of the present invention.

The following describes the present invention in detail with reference to the accompanying drawings and specific embodiments. It should be noted that the present invention is not limited to the specific embodiments described below. In addition, for simplicity, detailed description of the known art not directly related to the present invention is omitted to prevent confusion with respect to the understanding of the present invention.

Multiple embodiments according to the present invention are specifically described below, with an LTE mobile communications system and its subsequently evolved version serving as exemplary application environments, and with a base station and a user equipment that support NB-IOT serving as examples. However, it should be noted that the present invention is not limited to the following embodiments, but is applicable to other wireless communications systems, such as a future 5G cellular communications system, and is applicable to other base stations and user equipments, such as base stations and user equipments supporting eMTC, MMTC, and so on.

Prior to the specific description, several terms mentioned in the present invention are illustrated as follows. The terms involved in the present invention shall have the meanings set forth below, unless otherwise indicated.

RRC (Radio Resource Control) message: radio resource control message.

CCCH (Common Control Channel): common control channel, which is used for transmitting random access-related control information.

DCCH (Dedicated Control Channel): dedicated control channel, which is used for transmitting control messages from or to a user equipment.

NAS (Non-access Stratum) message: non-access stratum message, which is used for exchanging data or signaling between a user equipment and a core network entity, where the data or signaling is encapsulated in an NAS packet data unit (NAS PDU). The data is user data, and the signaling is non-user data exchanged between the user equipment and the core network entity. The data or signaling is transparent to a base station, that is, the base station does not need to understand the specific content of the NAS PDU, but the base station directly forwards the NAS PDU (data or signaling) from a sending end (the core network entity or the user equipment) to a receiving end (the user equipment or the core network entity).

NAS signaling message: non-access stratum signaling message, which is a message for implementing signaling exchange between a user equipment and a core network entity (for example, an MME), that is, an NAS PDU carries signaling.

NAS data message: non-access stratum data message, which is a message for implementing data exchange between a user equipment and a core network entity (for example, an S-GW), that is, an NAS PDU carries data.

SRB (Signaling Radio Bearer): signaling radio bearer, which is used for transmitting only RRC messages and NAS messages.

The following describes the present invention in detail with reference to the accompanying drawings and specific embodiments.

FIG. 1 is a schematic diagram illustrating the configuration of signaling radio bearers between a base station and a user equipment according to an embodiment of the present invention. As shown in FIG. 1, in S100, a base station 20 receives an RRC connection request message from a user equipment 30. In S110, the base station 20 sends a response message that is RRC connection setup message to the user equipment 30 on a first signaling radio bearer (SRB) (for example, SRB0). The first signaling radio bearer (SRB) can use a CCCH.

Besides, the response message that the RRC connection setup message can contain configuration information for a second signaling radio bearer (SRB). The second SRB is used for transmitting a first NAS message, and may further transmit RRC messages, and the configuration information can comprise a radio link control (RLC) mode. The radio link control (RLC) mode comprises an RLC acknowledged mode (RLC AM) and an RLC unacknowledged mode (RLC UM) or other RLC modes. For example, the configuration information can configure the second SRB to support the radio link control unacknowledged mode (RLC UM).

Preferably, the second signaling radio bearer (for example, SRB1) can use a DCCH. NAS messages can be transmitted on the second signaling radio bearer. For example, the NAS messages can be NAS data messages. Alternatively, the NAS messages can be NAS signaling messages. Alternatively, the NAS messages can be NAS signaling messages and NAS data messages.

Alternatively, the response message that is the RRC connection setup message can further contain configuration information for a third signaling radio bearer, and the third signaling radio bearer (for example, SRB1bis) can use a DCCH. In this case, the NAS data messages can be transmitted on the second signaling radio bearer, while the NAS signaling messages can be transmitted on the third signaling radio bearer, and the third signaling radio bearer can further transmit RRC messages. In this case, the RRC messages are not transmitted on the second signaling radio bearer.

Alternatively, the second signaling radio bearer and the third signaling radio bearer can share a packet data convergence protocol (PDCP) entity.

Several embodiments of the present invention are described in detail below.

Embodiment 1

In this embodiment, RRC messages, NAS signaling messages, and NAS data messages are transmitted using the same signaling radio bearer.

Specifically, the RRC messages, the NAS signaling messages, and the NAS data messages can be transmitted using a second signaling radio bearer, for example, the second signaling radio bearer can be SRB1. Some or all of related parameters of the second signaling radio bearer can be configured for a user equipment (UE) by a base station (eNB) through a first signaling radio bearer.

Preferably, the first signaling radio bearer is a signaling radio bearer that transmits RRC messages using a CCCH logical channel, for example, the first signaling radio bearer can be SRB0. The second signaling radio bearer is a signaling radio bearer that transmits RRC information, NAS signaling messages, and NAS data messages using a DCCH logical channel. The related parameters of the second signaling radio bearer may comprise a signaling radio bearer identifier, a logical channel identifier, RLC configuration parameters, logical channel configuration parameters, and so on.

The base station (eNB) may configure a corresponding radio link control (RLC) mode for the second signaling radio bearer according to reliability requirements (or quality of service (QoS) requirements) of data to be transmitted, where the RLC mode comprises, but is not limited to, an RLC AM or an RLC UM or other RLC mode. Optionally, the base station may indicate in a configuration message that the second signaling radio bearer uses default configuration, where the default configuration is parameter values already configured in the RRC specification.

Besides, some parameters of the second signaling radio bearer may use default configuration, while other parameters are configured by the base station. For example, the logical channel identifier and the RLC mode of the second signaling radio bearer use default configuration, and other related parameters are configured by the base station. Optionally, the default configuration of the RLC mode is the RLC UM or other RLC mode.

Embodiment 2

In this embodiment, RRC messages, NAS signaling messages, and NAS data messages are transmitted using different signaling radio bearers.

Specifically, the NAS data messages can be transmitted using a second signaling radio bearer while the RRC messages and the NAS signaling messages can be transmitted using a third signaling radio bearer. For example, the second signaling radio bearer can be SRB1bis, and the third signaling radio bearer can be SRB1. All or some of related parameters of the second signaling radio bearer and/or the third signaling radio bearer can be configured for a user equipment (UE) by a base station through a first signaling radio bearer.

Preferably, the first signaling radio bearer is a signaling radio bearer that transmits RRC messages using a CCCH logical channel. For example, the first signaling radio bearer can be SRB0. The second signaling radio bearer is a signaling radio bearer that transmits NAS data messages using a DCCH logical channel. The third signaling radio bearer is a signaling radio bearer that transmits RRC information and NAS signaling messages using a DCCH logical channel.

The base station (eNB) can configure corresponding RLCs modes for the second signaling radio bearer and the third signaling radio bearer according to reliability requirements (or quality of service (QoS) requirements) of signaling (containing RRC messages and NAS signaling) and data to be transmitted, where the RLC modes include, but are not limited to, an RLC AM or an RLC UM or other RLC mode.

Besides, the base station can configure different logical channel identifiers for the second signaling radio bearer and the third signaling radio bearer.

Optionally, the logical channel identifier of the second signaling radio bearer may be predefined.

Optionally, the logical channel identifier of the third signaling radio bearer may be predefined.

Optionally, the second signaling radio bearer uses a default RLC mode. For example, the default configuration of the second signaling radio bearer is an RLC AM mode or an RLC UM mode.

Optionally, the third signaling radio bearer uses a default RLC mode. For example, the default configuration of the third signaling radio bearer is an RLC UM mode or an RLC AM mode.

Optionally, the base station can indicate in a configuration message that the second signaling radio bearer uses default configuration, where the default configuration is predefined. Optionally, the base station may indicate in a configuration message that the third signaling radio bearer uses default configuration, where the default configuration is predefined.

Optionally, some parameters of the second signaling radio bearer can use default configuration, while other parameters are configured by the base station. For example, the logical channel identifier of the second signaling radio bearer can use default configuration (for example, 3).

Optionally, some parameters of the third signaling radio bearer can use default configuration, while other parameters are configured by the base station. For example, the logical channel identifier of the third signaling radio bearer may use default configuration (for example, 1).

Optionally, the second signaling radio bearer and the third signaling radio bearer can share a packet data convergence protocol (PDCP) entity.

Embodiment 3

In this embodiment, a core network entity carries in a downlink NAS transmission message an indicator to indicate whether signaling or data is encapsulated in an NAS-PDU.

Specifically, if a base station not only needs to send NAS signaling but also needs to send NAS data in one RRC connection, the core network entity can carry an indicator in a downlink NAS transmission message when sending the message, where the indicator is used for indicating whether data or signaling is carried in an NAS PDU of the downlink NAS transmission message. In this way, the base station can select a corresponding signaling radio bearer according to the indicator to forward the NAS PDU to a user equipment. For example, if the indicator indicates that the NAS-PDU carries NAS signaling, the base station re-encapsulates the NAS-PDU encapsulated in the downlink NAS transmission message and then sends it to the user equipment through a second signaling radio bearer. If the indicator indicates that the NAS PDU carries NAS data, the base station re-encapsulates the NAS-PDU encapsulated in the downlink NAS transmission message and then sends it to the user equipment through a third signaling radio bearer. The second signaling radio bearer is a signaling radio bearer that transmits RRC information and NAS signaling messages using a DCCH logical channel. The third signaling radio bearer is a signaling radio bearer that transmits NAS data messages using a DCCH logical channel.

Similarly, if the user equipment has an NAS message to be sent to a core network, an upper layer will send a piece of indication information to a radio layer entity, and the radio layer entity will use the second signaling radio bearer or the third signaling radio bearer for transmission according to signaling or data encapsulated in the NAS message.

Figure 2:
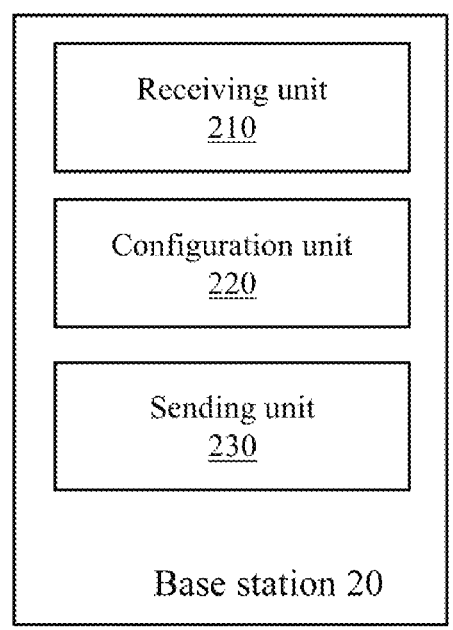
FIG. 2 is a block diagram of a base station according to an embodiment of the present invention.

FIG. 2 is a block diagram of a base station according to an embodiment of the present invention. As shown in FIG. 2, a base station 20 comprises a receiving unit 210, a configuration unit 220, and a sending unit 230.

The receiving unit 210 is configured to receive a radio resource control (RRC) connection request message from a user equipment.

The configuration unit 220 is configured to generate a response message that is RRC connection setup, where the response message RRC connection setup includes configuration information for a second SRB. The second SRB is used for transmitting a first non-access stratum (NAS) message, and can transmit RRC messages. The configuration information configures the second SRB to support a radio link control unacknowledged mode (RLC UM).

Preferably, the first NAS message may include an NAS data message and an NAS signaling message.

Preferably, a first SRB uses a common control channel (CCCH) logical channel, and the second SRB uses a dedicated control channel (DCCH) logical channel.

Preferably, the first NAS message can include an indication for a content carried in the first NAS message.

Alternatively, the response message RRC connection setup can further include configuration information for a third SRB, the third SRB is used for transmitting a second NAS message, and the configuration information configures the third SRB to support the radio link control unacknowledged mode (RLC UM) or a radio link control acknowledged mode (RLC AM). In this case, the first NAS message can include an NAS data message, while the second NAS message can include an NAS signaling message.

The sending unit 230 is configured to send the response message RRC connection setup to the user equipment on the first signaling radio bearer (SRB).

Alternatively, the receiving unit 210 is configured to receive a radio resource control (RRC) connection request message from a user equipment. The sending unit 230 is configured to send an RRC connection setup message to the UE through a first signaling radio bearer SRB0 that uses a common control channel (CCCH) logical channel, where the RRC connection setup message is used for establishing a second signaling radio bearer SRB1 that uses a first DCCH logical channel and a third signaling radio bearer SRB1bis that uses a second DCCH logical channel, the second signaling radio bearer SRB1 has a first logical channel identifier, and the third signaling radio bearer SRB1bis has a second logical channel identifier. The first logical channel identifier of SRB1 is different from the second logical channel identifier of SRB1bis.

Preferably, SRB1 is used for RRC messages and NAS messages.

Preferably, SRB1bis is used for RRC messages and NAS messages.

Preferably, the first logical channel identifier of SRB1 and the second logical channel identifier of SRB1bis are predefined.

Figure 3:
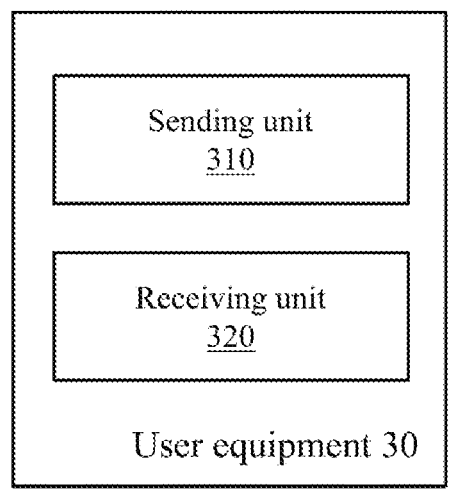
FIG. 3 is a block diagram of a user equipment according to an embodiment of the present invention.

FIG. 3 is a block diagram of a user equipment according to an embodiment of the present invention. As shown in FIG. 3, a user equipment 30 includes a sending unit 310 and a receiving unit 320.

The sending unit 310 is configured to send a radio resource control (RRC) connection request message to a base station.

The receiving unit 320 is configured to receive a response message that is RRC connection setup from the base station on a first signaling radio bearer (SRB). The response message RRC connection setup may include configuration information for a second SRB, where the second SRB is used for transmitting a first non-access stratum (NAS) message, and may transmit RRC messages. The configuration information configures the second SRB to support a radio link control unacknowledged mode (RLC UM).

Preferably, the first NAS message can include an NAS data message and an NAS signaling message.

Preferably, the first SRB uses a common control channel (CCCH) logical channel, and the second SRB uses a dedicated control channel (DCCH) logical channel.

Preferably, the first NAS message can include an indication for a content carried in the first NAS message.

Alternatively, the response message RRC connection setup can further include configuration information for a third SRB, the third SRB is used for transmitting a second NAS message, and the configuration information configures the third SRB to support the radio link control unacknowledged mode (RLC UM) or a radio link control acknowledged mode (RLC AM). In this case, the first NAS message can include an NAS data message, while the second NAS message can include an NAS signaling message.

Alternatively, the sending unit 310 is configured to send a radio resource control (RRC) connection request message. The receiving unit 320 is configured to receive an RRC connection setup message through a first signaling radio bearer SRB0 that uses a common control channel (CCCH) logical channel, where the RRC connection setup message is used for establishing a second signaling radio bearer SRB1 that uses a first DCCH logical channel and a third signaling radio bearer SRB1bis that uses a second DCCH logical channel, the second signaling radio bearer SRB1 has a first logical channel identifier, and the third signaling radio bearer SRB1bis has a second logical channel identifier. The first logical channel identifier of SRB1 is different from the second logical channel identifier of SRB1bis.

Preferably, SRB1 is used for RRC messages and NAS messages.

Preferably, SRB1bis is used for RRC messages and NAS messages.

Preferably, the first logical channel identifier of SRB1 and the second logical channel identifier of SRB1bis are predefined.

The methods and related devices according to the present invention have been described above in conjunction with preferred embodiments. It should be understood by those skilled in the art that the methods shown above are only exemplary. The method of the present invention is not limited to steps or sequences shown above. The network node and user equipment shown above may include more modules, for example, may further include modules that can be developed or developed in future to be applied to a base station or a UE. The various identifiers shown above are merely illustrative and not limitative. The present invention is not limited to specific information elements serving as examples of these identifiers. Those skilled in the art may make numerous alterations and modifications as illustrated in the shown embodiments.

It should be understood that the above-described embodiments of the present invention may be implemented through software, hardware, or a combination of software and hardware. For example, various components of the base station and user equipment in the above-described embodiments can be implemented through multiple devices, and these devices include but are not limited to: an analog circuit device, a digital circuit device, a digital signal processing (DSP) circuit, a programmable processor, an application specific integrated circuit (ASIC), a field programmable gate array (FPGA), a programmable logic device (CPLD), and the like.

In this application, the "base station" refers to a mobile communication data and control switching center with large transmit power and wide coverage area, including resource allocation scheduling, data receiving and transmitting functions. The "user equipment" refers to a user mobile terminal, for example, a terminal device that can perform wireless communication with a base station or a micro base station, including a mobile phone, a notebook, or the like.

In addition, the embodiments of the present invention disclosed herein may be implemented on a computer program product. More specifically, the computer program product is a product as follows: The product has a computer-readable medium on which computer program logic is encoded. The computer program logic, when executed on a computing device, provides relevant operations to implement the above-described technical solutions of the present invention. When executed on at least one processor of a computing system, the computer program logic enables the processor to execute the operations (methods) described in the embodiments of the present invention. Such an arrangement of the present invention is typically provided as software, code, and/or other data structures that are configured or encoded on a computer-readable medium, such as an optical medium (for example, a CD-ROM), a floppy disk, or a hard disk, or other media such as firmware or microcode on one or more ROM or RAM or PROM chips, or downloadable software images, shared database and so on in one or more modules. Software or firmware or such configuration may be installed on a computing device so that one or more processors in the computing device execute the technical solutions described in the embodiments of the present invention.

In addition, each functional module or each feature of the base station device and the terminal device used in each of the above-described embodiments may be implemented or executed by a circuit, which is usually one or several integrated circuits. Circuits designed to perform various functions described in this description may include general purpose processors, digital signal processors (DSPs), application specific integrated circuits (ASICs) or general purpose integrated circuits, field programmable gate arrays (FPGAs) or other programmable logic devices, discrete gate or transistor logic, or discrete hardware components, or any combination of the above. The general purpose processor may be a microprocessor; or the processor may be an existing processor, a controller, a microcontroller, or a state machine. The above-described general purpose processor or individual circuits may be configured by a digital circuit or may be configured by a logic circuit. In addition, when an advanced technology that can replace current integrated circuits emerges due to advances in semiconductor technology, the present invention may also use integrated circuits obtained using this advanced technology.

Although the present invention has been shown in connection with the preferred embodiments of the present invention, it will be understood by those skilled in the art that various modifications, substitutions and alterations may be made to the present invention without departing from the spirit and scope of the present invention. Accordingly, the present invention should not be defined by the above-described embodiments, but should be defined by the appended claims and their equivalents.

The invention claimed is:

1. A user equipment (UE), comprising:
sending circuitry, configured to send a radio resource control (RRC) connection request message; and receiving circuitry, configured to receive an RRC connection setup message through a first signaling radio bearer SRB0 that uses a common control channel (CCCH) logical channel, wherein the RRC connection setup message is used for establishing a second signaling radio bearer SRB1 that uses a first dedicated control channel (DCCH) logical channel and establishing a third signaling radio bearer SRB1bis that uses a second DCCH logical channel, the RRC connection setup message includes configuration information for the second signaling radio bearer SRB1 and the third signaling radio bearer SRB1bis, the second signaling radio bearer SRB1 has a first logical channel identifier, the third signaling radio bearer SRB1bis has a second logical channel identifier, and wherein the first logical channel identifier of SRB1 is different from the second logical channel identifier of SRB1bis.

2. The UE according to claim 1, wherein SRB1 is used for RRC messages and non-access stratum (NAS) messages.

3. The UE according to claim 1, wherein SRB1bis is used for RRC messages and non-access stratum (NAS) messages.

4. The UE according to claim 1, wherein the first logical channel identifier of SRB1 and the second logical channel identifier of SRB1bis are predefined.

5. A method executed by a user equipment (UE), the method comprising:
  sending a radio resource control (RRC) connection request message; and
  receiving an RRC connection setup message through a first signaling radio bearer SRB0 that uses a common control channel (CCCH) logical channel,
  wherein the RRC connection setup message is used for establishing a second signaling radio bearer SRB1 that uses a first dedicated control channel (DCCH) logical channel and establishing a third signaling radio bearer SRB1bis that uses a second DCCH logical channel, the RRC connection setup message includes configuration information for the second signaling radio bearer SRB1 and the third signaling radio bearer SRB1bis, the second signaling radio bearer SRB1 has a first logical channel identifier, the third signaling radio bearer SRB1bis has a second logical channel identifier, and wherein the first logical channel identifier of SRB1 is different from the second logical channel identifier of SRB1bis.

6. The method according to claim 5, wherein SRB1 is used for RRC messages and non-access stratum (NAS) messages.

7. The method according to claim 5, wherein SRB1bis is used for RRC messages and non-access stratum (NAS) messages.

8. The method according to claim 5, wherein the first logical channel identifier of SRB1 and the second logical channel identifier of SRB1bis are predefined.

9. A base station (eNB), comprising:
  receiving circuitry, configured to receive, from a user equipment (UE), a radio resource control (RRC) connection request message; and
  sending circuitry, configured to send to the UE an RRC connection setup message through a first signaling radio bearer SRB0 that uses a common control channel (CCCH) logical channel,
  wherein the RRC connection setup message is used for establishing a second signaling radio bearer SRB1 that uses a first dedicated control channel (DCCH) logical channel and establishing a third signaling radio bearer SRB1bis that uses a second DCCH logical channel, the RRC connection setup message includes configuration information for the second signaling radio bearer SRB1 and the third signaling radio bearer SRB1bis, the second signaling radio bearer SRB1 has a first logical channel identifier, the third signaling radio bearer SRB1bis has a second logical channel identifier, and wherein the first logical channel identifier of SRB1 is different from the second logical channel identifier of SRB1bis.

10. The eNB according to claim 9, wherein SRB1 is used for RRC messages and non-access stratum (NAS) messages.

11. The eNB according to claim 9, wherein SRB1bis is used for RRC messages and non-access stratum (NAS) messages.

12. The eNB according to claim 9, wherein the first logical channel identifier of SRB1 and the second logical channel identifier of SRB1bis are predefined.

13. A method executed by a base station (eNB), the method comprising:
  receiving, from a user equipment (UE), a radio resource control (RRC) connection request message; and
  sending, to the UE, an RRC connection setup message through a first signaling radio bearer SRB0 that uses a common control channel (CCCH) logical channel,
  wherein the RRC connection setup message is used for establishing a second signaling radio bearer SRB1 that uses a first dedicated control channel (DCCH) logical channel and establishing a third signaling radio bearer SRB1bis that uses a second DCCH logical channel, the RRC connection setup message includes configuration information for the second signaling radio bearer SRB1 and the third signaling radio bearer SRB1bis, the second signaling radio bearer SRB1 has a first logical channel identifier, the third signaling radio bearer SRB1bis has a second logical channel identifier, and wherein the first logical channel identifier of SRB1 is different from the second logical channel identifier of SRB1bis.

14. The method according to claim 13, wherein SRB1 is used for RRC messages and non-access stratum (NAS) messages.

15. The method according to claim 13, wherein SRB1bis is used for RRC messages and non-access stratum (NAS) messages.

16. The method according to claim 13, wherein the first logical channel identifier of SRB1 and the second logical channel identifier of SRB1bis are predefined.

* * * * *